A. DE VILBISS, Jr.
WEIGHING SCALE.
APPLICATION FILED JAN. 14, 1910.
1,005,943.
Patented Oct. 17, 1911.
3 SHEETS—SHEET 3.
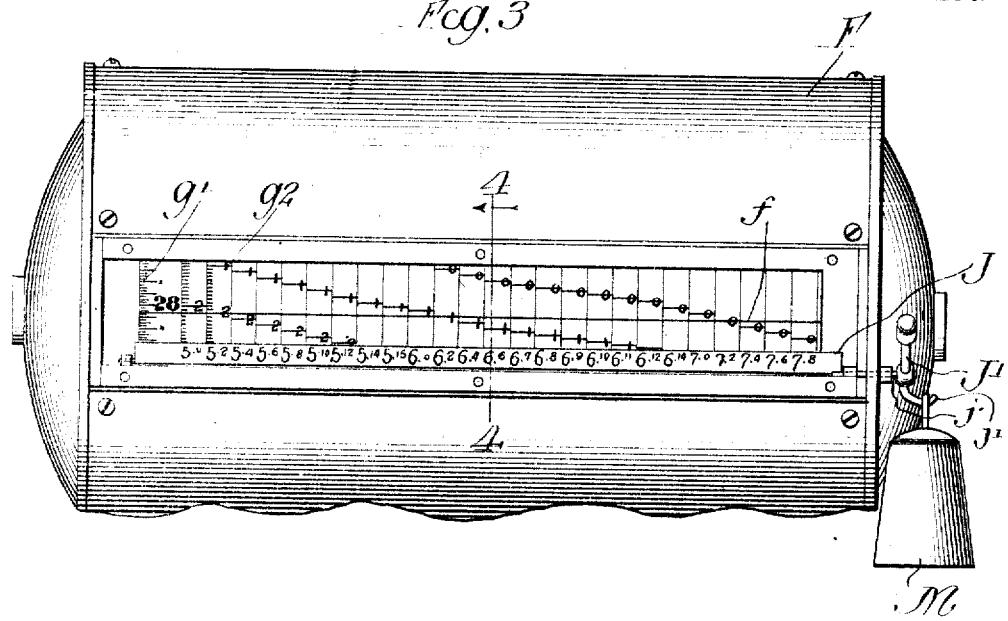
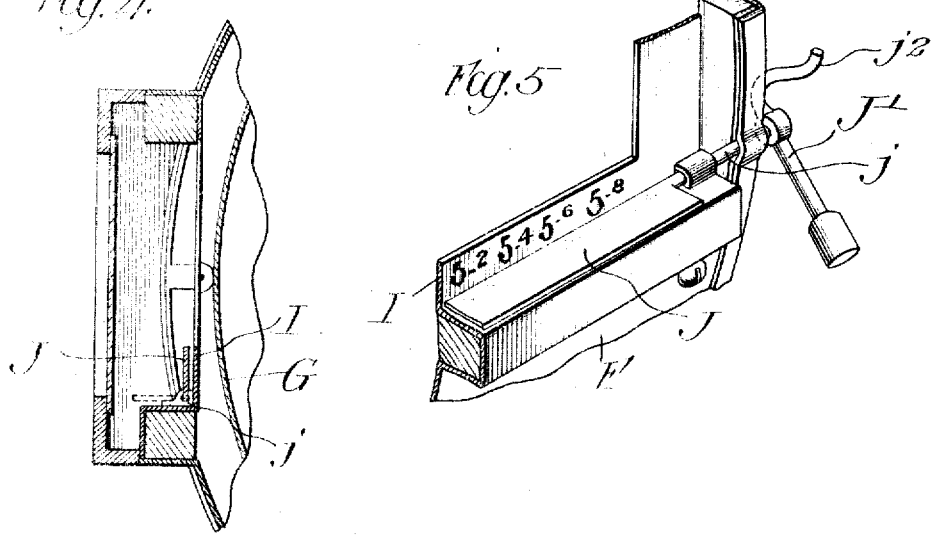
Witnesses:
Inventor:
Allen De Vilbiss Jr

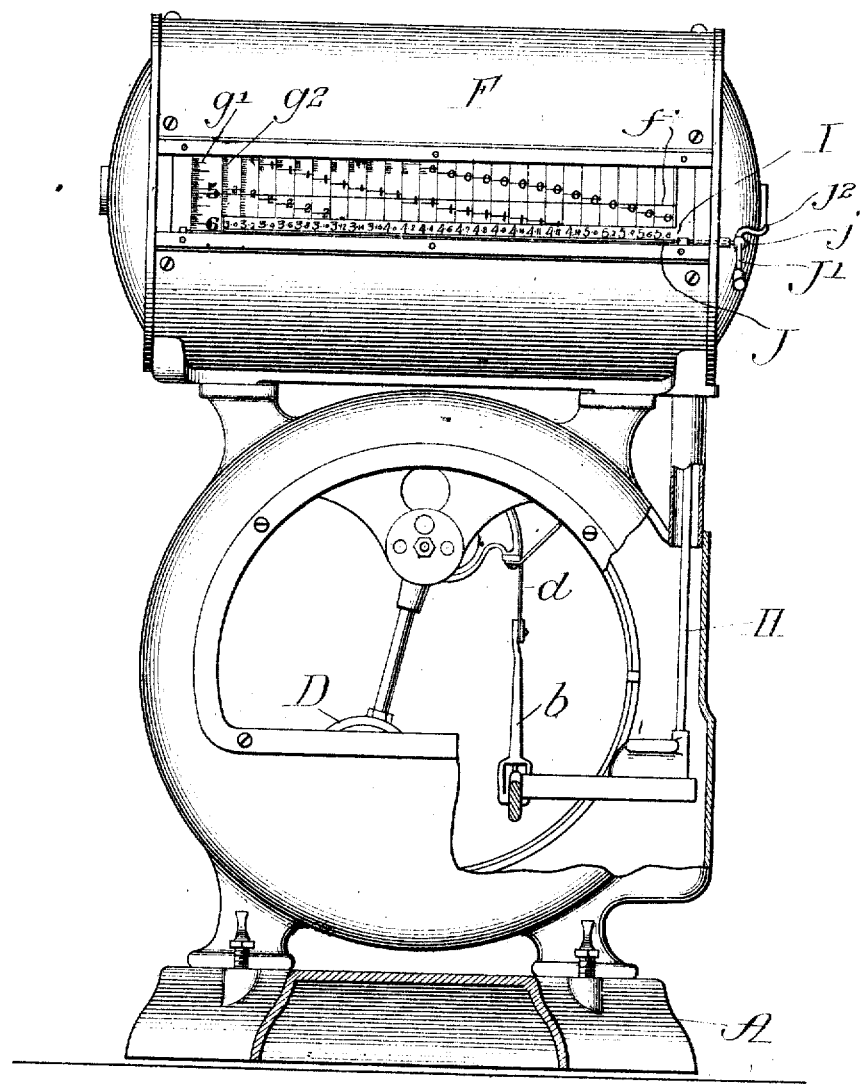

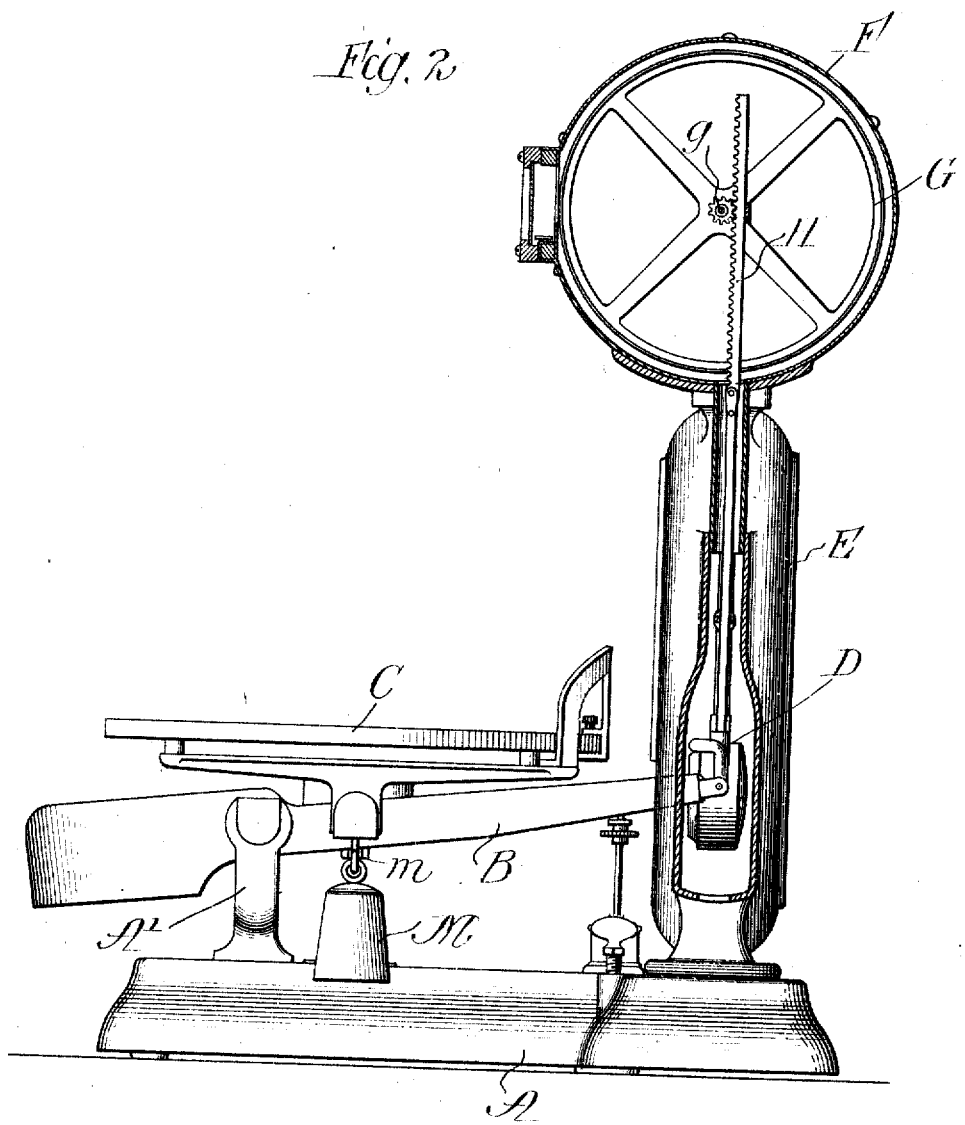

UNITED STATES PATENT OFFICE.

ALLEN DE VILBISS, JR., OF TOLEDO, OHIO, ASSIGNOR TO TOLEDO COMPUTING SCALE COMPANY, OF TOLEDO, OHIO, A CORPORATION OF NEW JERSEY.

WEIGHING-SCALE.

1,005,943.  Specification of Letters Patent.  Patented Oct. 17, 1911.

Application filed January 14, 1910. Serial No. 538,060.

*To all whom it may concern:*

Be it known that I, ALLEN DE VILBISS, Jr., a citizen of the United States, residing at Toledo, in the county of Lucas and State of Ohio, have invented certain new and useful Improvements in Weighing-Scales, of which the following is a specification.

The present invention relates to weighing scales equipped for readily ascertaining the net weight of goods weighed in receptacles which may themselves vary considerably in weight, and the principal object is to provide for an extensive range of tare weights without having the numbers so small as to be difficult to read.

In carrying out the invention in the form here shown I provide a movable member on which is inscribed a series of numerals for the higher tare weights, such numerals not being displayed normally but a lower series of numerals being displayed, which latter series of numerals will be concealed by the movable member when the latter is shifted to display its series of numerals. Furthermore a weight which normally keeps the weighing parts in equilibrium with the zero indication of gross weight, is removable and adapted when removed to be applied to the movable member carrying the higher tare numerals so as to shift such member and display its numerals.

It will be understood that the series of tare numerals extend adjacent an indicating member having a series of net weight numerals and graduation marks, as for example a rotating cylinder or drum with circumferential series of such numerals and graduations, said drum also having a series of gross weight numerals and graduation marks.

In the drawings which accompany and form a part of this specification, Figure 1 represents partly in front elevation and partly in section a weighing scale equipped with means for carrying out the present invention, such scale supposedly in the act of weighing in gross five pounds two ounces; Fig. 2 is a partial side elevation and vertical section of the scale; Fig. 3 is an enlarged front elevation of the indicating portion of the scale with the weight taken off the beam and applied to the movable tare indicating member; Fig. 4 is a sectional view on a still larger scale taken on line 4—4 of Fig. 3; and Fig. 5 shows some of the parts in perspective.

In said drawings the reference letter A designates the supporting base of the scale and B the main lever or beam which is suitably pivoted in standards A' rising from the base. A platform or other suitable form of goods receiver C is mounted in the customary way upon the beam B on the inner side of its pivot and on the outer side of its pivot the beam has sufficient mass or is sufficiently weighted to normally uphold the platform acting in concert with the weighing element, in the present instance a pendulum D, to which the inner end of the beam is connected. Said pendulum is suspended in a housing E rising from the rear part of the base and is connected to the beam by a flexible strip $d$ and a stirrup $b$. The housing E is surmounted by a cylindrical casing F within which rotates a drum G which is operatively connected to the beam through the medium of a pinion $g$ and a rack H, the latter pivotally connected to the beam. The cylinder or drum is such a one as commonly employed to carry a table of computations in addition to a circumferential series of weight numerals and graduations, but in the present instance this drum or cylinder carries, in addition to the ordinary series of gross weight numerals and graduations $g'$, series after series of net weight numerals and graduations $g^2$ graded with reference to each other circumferentially of the drum as indicated in Figs. 1 and 3. A portion of the drum from end to end shows through a sight opening extending across the cylindrical casing as usual and a reading line $f$ may be provided in any suitable way as by marking the glass which closes the sight opening or extending a wire from side to side of the latter. Along the lower side of the sight opening there extends a plate I on which is inscribed a series of tare numerals one for each of the circumferential series of net weight numerals on the drum.

In using scales such as above described the commodity whose weight is to be ascertained is placed upon the platform in its receptacle and, the weight of the receptacle having been first ascertained or being already known, the corresponding numeral on the plate I is singled out and the net weight read from the series in line with such numeral, the user being guided of course by where the reading line $f$ cuts such series of net weight numerals or graduations.

Passing now to the means for carrying out the present invention, there is arranged along the lower side of the sight opening an additional plate J normally lying flat but adapted to be turned up to expose its own series of tare weight numerals and conceal those on the plate I as shown in Fig. 3. Said plate J has trunnions at its end which journal in suitable bearings on the sill of the sight opening and one of these trunnions $j$ extends out through the side of the casing F where there is secured to it a weighted arm J' adapted to normally hold the plate lying flat, as shown in Fig. 5.

A weight M, Fig. 2, hangs normally from a hook $m$ on the platform. When the tare capacity of the scale is to be increased beyond the range of numerals on the plate I, said weight is taken off the hook and applied to a hook $j'$ which is secured to the trunnion $j$ and projects oppositely to the weighted arm J'. The application of this weight obviously rocks the plate J to an upright position such as shown in Fig. 3 making its series of numerals take the place of those on the fixed plate I in similar relation to the several series of net weight numerals on the drum. Of course the removal of the weight M from the hook $m$ reduces the counterbalance to the pendulum and the weighted outer end of the beam and this is designed to be in degree proportionate to or corresponding with the advance in the tare weight indication. Thus, with the removal of said weight from the hook $m$ the cylinder turns backward an extent which provides for two pounds of weight being sustained upon the platform before the cylinder again indicates zero, and the several tare weight indications on the plate J are respectively two pounds in excess of the corresponding tare weight indications on the fixed plate I. It will be obvious that with the weight M removed from the hook $m$ and applied to the hook $j'$, the scale may be used in the same manner as before described but will be in condition to take care of tare through an advanced range.

Thus it will be seen that the above described construction is well adapted to fulfil the object primarily stated. At the same time it will be understood that the construction here shown and described is susceptible of modification within the scope of the invention.

What is claimed is:

1. In a weighing scale the combination of a movable indicating member bearing several series of net weight indications, and means bearing a plurality of series of tare weight indications, with provisions for causing one series to supplant the other in registering relationship to the net weight indications.

2. In a weighing scale the combination of a movable indicating member bearing several series of net weight indications, a fixed part bearing a series of tare indications registering with the several series of net weight indications respectively, and a movable member also bearing a series of tare indications but representing a continuation of those on the fixed part, said movable member adapted when moved from normal to display its series of tare indications in registry with the several series of net weight indications and conceal the series of tare weight indications on the fixed part.

3. In a weighing scale the combination of an inclosing casing having a sight opening and bearing a series of tare weight indications extending along such opening; a cylinder journaled in said casing and bearing several circumferential series of net weight indications to show through said sight opening in registry with the tare indications; and a pivoted plate bearing a series of tare indications and adapted to be moved to a position displaying the same and concealing those on the casing.

4. In a weighing scale the combination of a movable indicating member bearing several series of net weight indications, weighing parts controlling the position of such member and including a detachable weight, and means bearing a plurality of series of tare weight indications, with provisions including a support for the detachable weight for causing one series to supplant the other in registering relationship to the net weight indications.

5. In a weighing scale the combination of a movable indicating member bearing several series of net weight indications, a fixed part bearing a series of tare indications registering with the several series of net weight indications respectively, a movable member also bearing a series of tare indications but representing a continuation of those on the fixed part, said movable member adapted when moved from normal to display its series of tare indications in registry with the several series of net weight indications and conceal the series of tare weight indications on the fixed part, and weighing parts controlling the position of the movable indicating member and including a detachable weight adapted when detached to be applied to the said movable tare indicating member, substantially as and for the purpose described.

6. In a weighing scale the combination of an inclosing casing having a sight opening, and bearing a series of tare weight indications extending along such opening, a cylinder journaled in said casing and bearing several circumferential series of net weight indications to show through said sight opening in registry with the tare indications; a pivoted plate bearing a series of tare indications and adapted to be moved to a position displaying the same and concealing those on the casing, a beam operatively connected to said cylinder, load-counterbalancing means applied to the beam, and a weight detachable from the latter and applicable to the said pivoted plate, substantially as and for the purpose described.

7. In a weighing scale the combination of an inclosing casing having a sight opening, and bearing a series of tare weight indications extending along such opening, a cylinder journaled in said casing and bearing several circumferential series of net weight indications to show through said sight opening in registry with the tare indications; a pivoted plate bearing a series of tare indications and adapted to be moved to a position displaying the same and concealing those on the casing, said plate having a weighted arm and a hook, a beam operatively connected to said cylinder, load-counterbalancing means applied to the beam, and a weight detachable from the latter and applicable to the hook of said pivoted plate.

ALLEN DE VILBISS, Jr.

Witnesses:
 ARTHUR STULL,
 F. J. SHEFFER